(12) United States Patent
Berengut et al.

(10) Patent No.: US 6,860,519 B2
(45) Date of Patent: Mar. 1, 2005

(54) BALL JOINT APPARATUS AND METHOD OF FABRICATION

(75) Inventors: Vadim Berengut, Woodland Hills, CA (US); Arthur Lyman Moore, Canyon Country, CA (US); Louis Rivera, Northridge, CA (US); Wilford R. Tate, Castaic, CA (US)

(73) Assignee: Avica Inc., Simi Valley, CA (US)

( * ) Notice: Subject to any disclaimer, the term of this patent is extended or adjusted under 35 U.S.C. 154(b) by 0 days.

(21) Appl. No.: 10/640,115

(22) Filed: Aug. 13, 2003

(65) Prior Publication Data

US 2004/0100095 A1 May 27, 2004

Related U.S. Application Data

(63) Continuation of application No. 09/875,533, filed on Jun. 5, 2001, now abandoned.
(60) Provisional application No. 60/212,300, filed on Jun. 17, 2000.

(51) Int. Cl.[7] .......................... F16L 51/02; F16L 27/04
(52) U.S. Cl. ...................... 285/226; 285/261; 285/299
(58) Field of Search ........................ 285/49, 226, 261, 285/298, 299, 300, 301

(56) References Cited

U.S. PATENT DOCUMENTS

| | | | | |
|---|---|---|---|---|
| 1,099,220 A | * | 6/1914 | Ward ........................ 285/148.4 |
| 1,351,875 A | * | 9/1920 | Schreiber ....................... 285/45 |
| 1,821,274 A | * | 9/1931 | Plummer ....................... 285/11 |
| 1,868,696 A | * | 7/1932 | Crary .......................... 285/181 |
| 2,175,191 A | * | 10/1939 | Goyette ......................... 84/399 |
| 2,500,720 A | * | 3/1950 | Van Der Heem ............... 285/7 |
| 2,604,339 A | * | 7/1952 | Kaysing et al. ............. 285/300 |
| 2,613,087 A | * | 10/1952 | Alford ........................ 285/261 |
| 2,910,308 A | * | 10/1959 | Carr ............................. 285/27 |
| 3,002,269 A | * | 10/1961 | Hopkins ..................... 29/441.1 |
| 3,219,365 A | * | 11/1965 | Webb ........................... 285/45 |
| 3,461,528 A | * | 8/1969 | Pieper et al. .......... 29/898.048 |
| 3,695,645 A | * | 10/1972 | Mommsen .................. 285/261 |
| 3,770,303 A | * | 11/1973 | Hallet .......................... 285/45 |
| 3,837,685 A | * | 9/1974 | Miller .......................... 285/45 |
| 4,151,632 A | * | 5/1979 | Green ....................... 29/441.1 |
| 4,165,107 A | * | 8/1979 | Affa et al. .................... 285/41 |
| 4,350,372 A | * | 9/1982 | Logsdon ...................... 285/45 |

(List continued on next page.)

FOREIGN PATENT DOCUMENTS

| | | | |
|---|---|---|---|
| AU | 137602 | * | 5/1948 |
| CA | 609137 | * | 11/1960 |
| DD | GR 413263 | * | 5/1925 |

OTHER PUBLICATIONS

Technical Bulletin entitled "Low Bending Moment Ball Socket Joint" (Stainless Steel Products, Inc. Bulletin No. 050188, 3 pages).*

Technical Bulletin entitled "Bellows Ball Joints" (General Connectors Technical Bulletin No. 1350, 4 pages).*

*Primary Examiner*—James M. Hewitt
(74) *Attorney, Agent, or Firm*—Henry M. Bissell (57) ABSTRACT

A ball joint apparatus for a pressurized fluid line includes a bellows and a pair of opposed tube portions to accommodate limited flexure between the tube portions. The apparatus also includes an annular ball element positioned over one of the tube portions and an annular housing member mounted on the other tube portion and overlapping the ball member. As initially formed, the overlapping end of the housing member is open and of a diameter exceeding the maximum diameter of the ball member to permit ease of assembly. After the component parts are in position and welded as desired, the apparatus is placed in a hydraulic press and the open end of the housing member is necked down by a swaging process to establish bearing contact with the ball member. Alternative arrangements of the apparatus are provided for use with stainless steel tubing and with titanium tubing.

14 Claims, 6 Drawing Sheets

U.S. PATENT DOCUMENTS

| | | | | | |
|---|---|---|---|---|---|
| 4,508,373 A | * | 4/1985 | Ward | | 285/226 |
| 4,606,668 A | * | 8/1986 | Schmidt | | 403/140 |
| 4,643,463 A | * | 2/1987 | Halling et al. | | 285/226 |
| 4,856,822 A | * | 8/1989 | Parker | | 285/62 |
| 4,893,847 A | * | 1/1990 | Hess | | 285/226 |
| 4,911,482 A | * | 3/1990 | Doat | | 285/226 |
| 5,286,071 A | * | 2/1994 | Storage | | 285/226 |
| 5,505,498 A | * | 4/1996 | Halling et al. | | 285/111 |
| 5,611,577 A | * | 3/1997 | Meyer et al. | | 285/261 |

* cited by examiner

BALL JOINT APPARATUS AND METHOD OF FABRICATION

CROSS-REFERENCE TO RELATED APPLICATION

This application is a continuation of prior application Ser. No. 09/875,533, filed on Jun. 5, 2001, now abandoned, which has benefit to U.S. Provisional Application No. 60/212,300, filed Jun. 17, 2000.

BACKGROUND OF THE INVENTION

1. Field of the Invention

The present invention generally relates to pressurized fluid lines and, more particularly, to a ball joint apparatus for permitting relative flexure in such lines.

2. Description of the Related Art

Ball joint apparatus for pressurized fluid lines in the past has incorporated a somewhat flexible bellows between two end tubes encompassed within a protective assembly in the form of a ball joint. Such apparatus as are known include a ball which is welded to one end tube and a housing which is welded to the other end tube. The housing and the ball together establish a ball joint which holds the end tubes and bellows in relative position. Since both ends of the housing are smaller in diameter than the ball member, it has been the practice to fabricate the housing in two pieces and assemble them from both ends of the apparatus so as to enclose the ball member. Thereafter, the two pieces of the housing are welded together by fusion welding. This is a relatively difficult and costly step and introduces a further opportunity for failure in the joint.

SUMMARY OF THE INVENTION

Ball joints are used in fluid lines to impart limited flexibility for the purpose of accommodating tolerances, thermal expansion and vehicular motion. They can be used in almost any type of fluid line. However, the particular joint under consideration is adapted for use in jet aircraft engine bleed air ducting.

It should be kept in mind that the term "ball joint", as used herein and as such terms are understood in the related industry dealing with pressurized fluid lines, is not a precisely defined descriptive term. That is, applying the term to a pivotable hollow structure does not mean that the core member is a ball or sphere; neither is the encasing structure (housing) necessarily of a spherical shape, as these terms are used in the mathematical sense. Only when true mathematically defined spherical shape is described in mathematical terms, as in U.S. Pat. No. 5,611,577 ("tri-axial symmetry"), is it intended that terms such as "ball" and "sphere" or "spherical" are to be defining in the precise mathematical sense. A better understanding of the meaning of such terminology as used herein will be gained from a review of disclosed structure in the patent drawings with interpretation of shape in accordance with the related description thereof.

In brief, particular arrangements in accordance with the present invention comprise a bellows and two end tubes for coupling into a fluid line. An inner ball and outer housing surround the bellows to maintain integrity of the assembly. It is a feature of the present invention that the outer housing is fabricated in one piece, thereby eliminating the need for the fusion welding step of previously known ball joint assemblies. There is no fusion welding in particular embodiments of the present invention and only two roll-resistant seam welds are required for assembly.

In accordance with particular aspects of the present invention, the outer housing is formed in one piece having an open end of sufficient diameter to be assembled over the ball member without interference. Thereafter, the housing is further formed by means of a unique coining or swaging operation. The unit, after the bellows is seam welded, is put in a hydraulic press and the outer surface on the end of the housing is formed into a sphere. This sphere conforms to the surface of the inner ball. A reinforcing lip is also formed in the housing, during the swaging process, for additional strength.

BRIEF DESCRIPTION OF THE DRAWINGS

A better understanding of the present invention may be realized from a consideration of the following detailed description, taken in conjunction with the accompanying drawings, in which.

DESCRIPTION OF THE PREFERRED EMBODIMENTS

Figure 1:
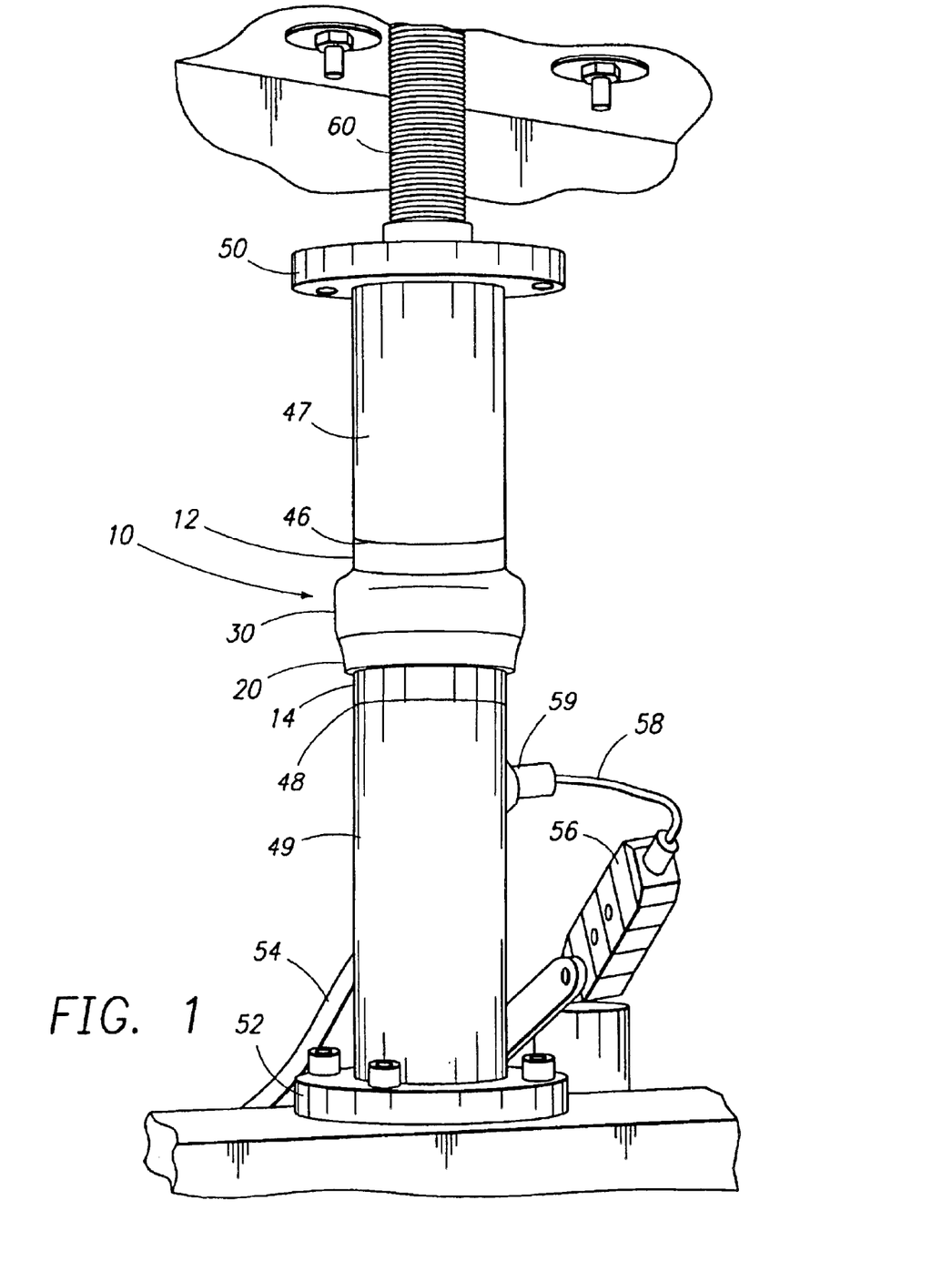
FIG. 1 is a view of one particular arrangement of a ball joint assembly in accordance with the invention, shown installed in a cycle test rig.
Figure 2:
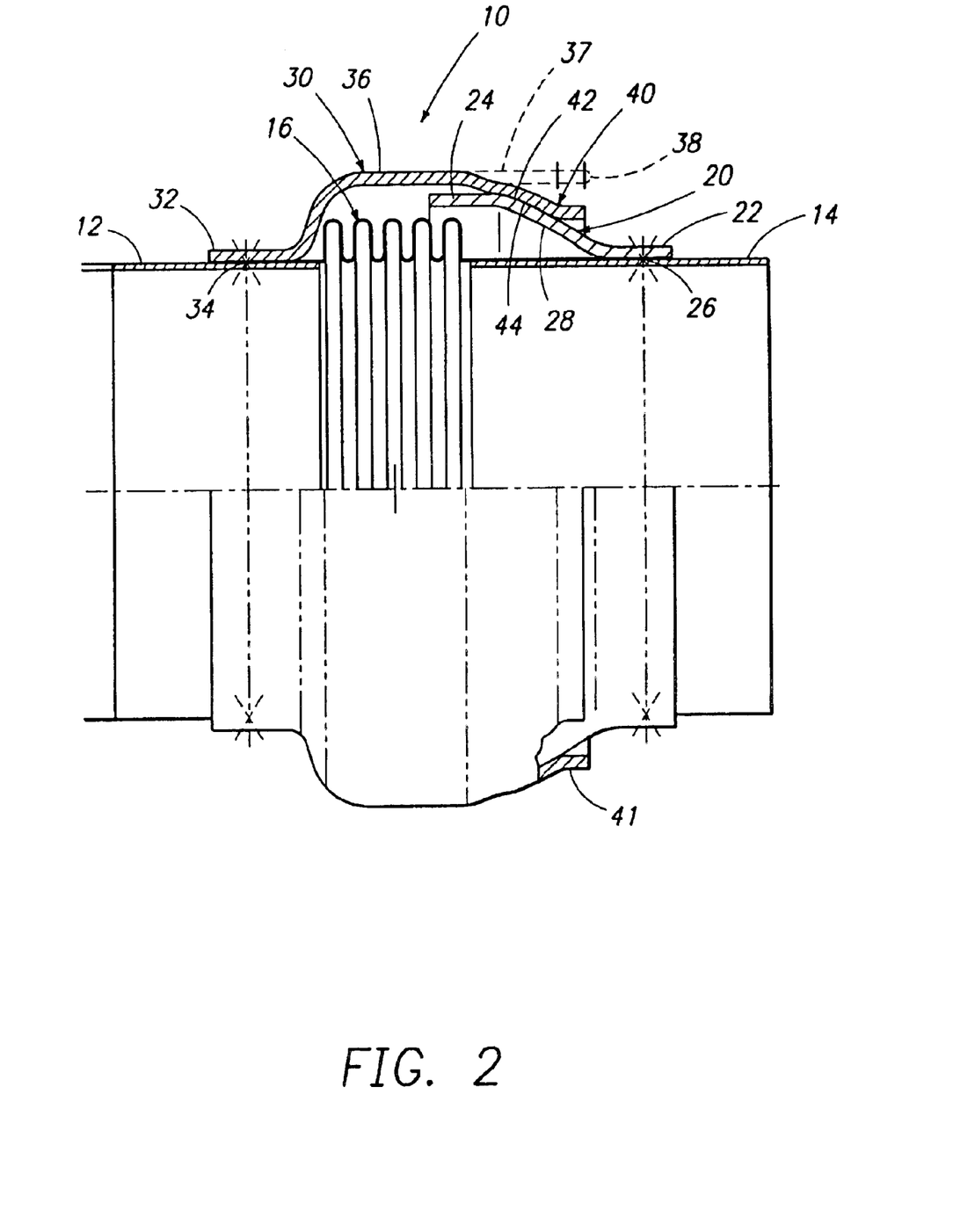
FIG. 2 is a schematic quarter-sectional view, partially broken away, of the ball joint assembly of FIG. 1.

The ball joint assembly 10 of FIG. 1 can best be understood by reference to FIG. 2, which is a schematic diagram showing structural details of the ball joint assembly 10. FIG. 2 shows the assembly 10 as comprising left and right tubes 12, 14 which are joined at a central portion by a bellows 16. The bellows 16 serves to permit relative flexure within a limited angular range between the tubes 12 and 14. Assembly 10 has a ball 20 of annular shape increasing in diameter from a collar portion 22 to an enlarged ring portion 24. The collar portion 22 is welded to the right-hand tube 14 at 26. The collar and ring portions 22, 24, are shaped to be generally parallel to the tube 14, and the transition portion 28 between them has a generally arcuate shape adapted to provide a bearing surface for the engagement portion of the other half of the ball joint assembly.

A housing 30 extends from a collar portion 32 having an inner diameter matching the outer diameter of the tube 12 to which it is welded at 34. From the collar 32, the housing 30 increases in diameter to a midportion 36. As initially fabricated, the diameter of the midportion 36 of the housing 30 is continued, as shown by the broken outline 37, to the right-hand end 38. After the housing 30 and ball 20 are welded in place on the tubes 12, 14, the assembly is placed in a hydraulic press for a swaging step which closes down the right-hand end 38 to assume the general arcuate shape shown for the portion 40. The shape terminates in a lip 41 for additional strength. The necked-down end 40 in cooperation with the ball member 20 serves to retain the entire assembly of the bellows and tubes against undue expansion while permitting a limited flexure of the joint as needed in operation. Adjacent bearing surfaces 42, along the inside of the necked-down housing portion 40, and 44, along the outer surface of the ball portion 28, are suitably lubricated to permit flexure of the joint without undue friction or binding.

In the test fixture assembly shown in FIG. 1, the tube portions 12 and 14 are welded to tube extensions 47 and 49 at weld points 46 and 48, respectively. The tubes 47 and 49 extend to mounting flanges 50 and 52 which affix the ball joint assembly in the recycling fixture for extended testing. A pressurizing tube 54 extends to the back of tube 49 and a recording device 56 is shown connected to a pressure sensor 59 via electrical conduit 58. A jackscrew 60 is provided at the top of the test stand for adjusting the axial loading on the ball joint assembly 10 during testing.

In the test fixture of FIG. 1 with a particular ball joint assembly 10, fabricated for 2.0 inch diameter stainless steel tubing, various tests were conducted. The test unit was pressurized at room temperature with helium at 605 pounds per square inch gauge (psig) underwater for two minutes. No leakage was observed. At 810° F., th unit was pressurized at 375 psig for two minutes. Again no leakage or deformation was observed.

The tested ball joint apparatus was angulated from 0 to +3, 5 and 7 degrees for more than 60,000 cycles at 60, 120, 175 and 250 psig at 600° F. in one particular test procedure. During the course of cycling, the unit was observed to operate smoothly and showed no scratches or significant wear in the drive lubricant material which was applied to the bearing surfaces during fabrication. In fact, cycle testing tended to burnish the lubricant and stainless steel surfaces as cycling progressed. There was no evidence of damage to the unit during this testing. The test unit was subjected to internal pressure with water up to 1200 psig. In this pressure test, no out-of-tolerance deformation or leakage was observed.

Figure 3:
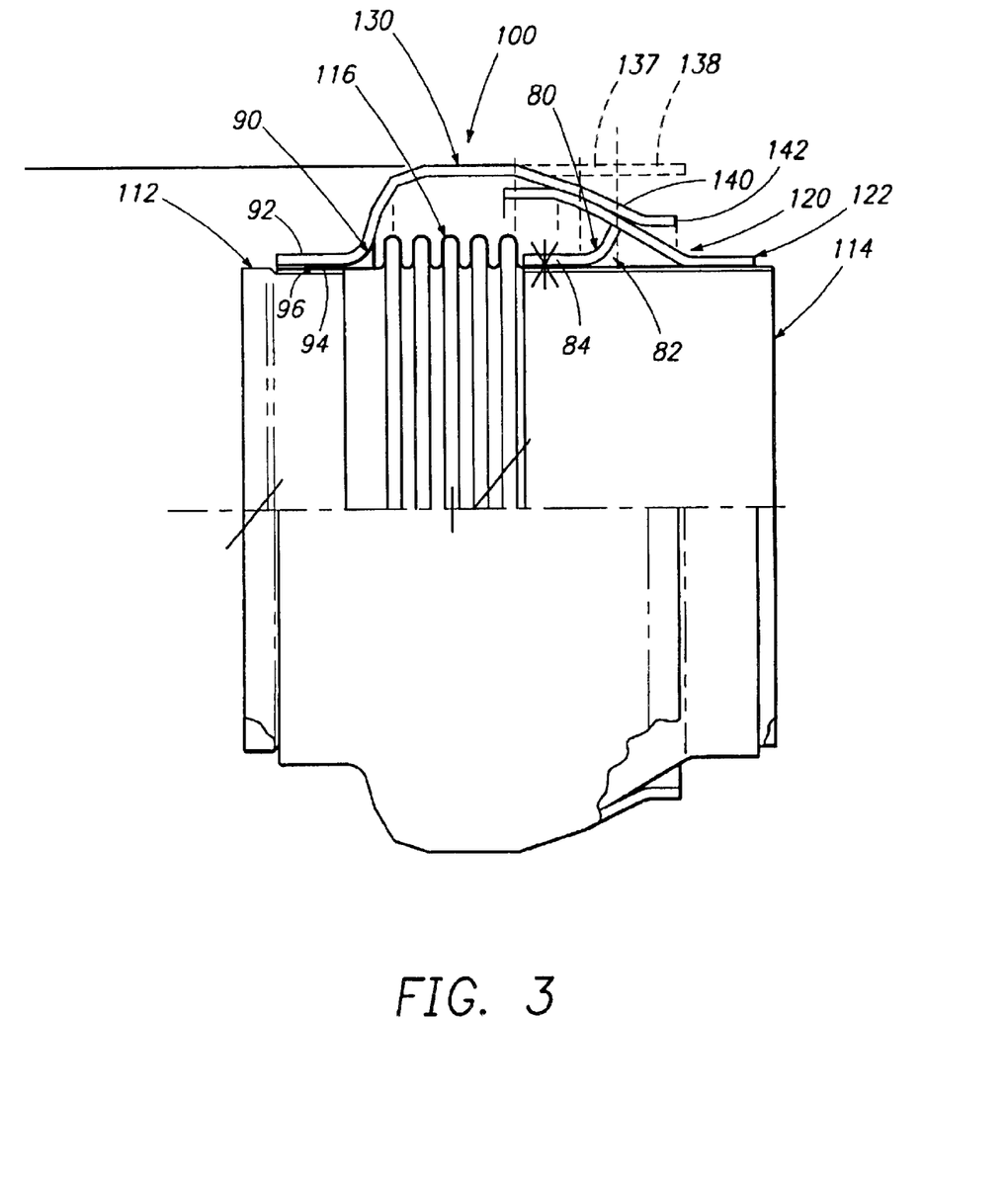
FIG. 3 is a schematic quarter-sectional view, partially broken away, of an alternative embodiment of a ball joint apparatus in accordance with the invention.
Figure 4:
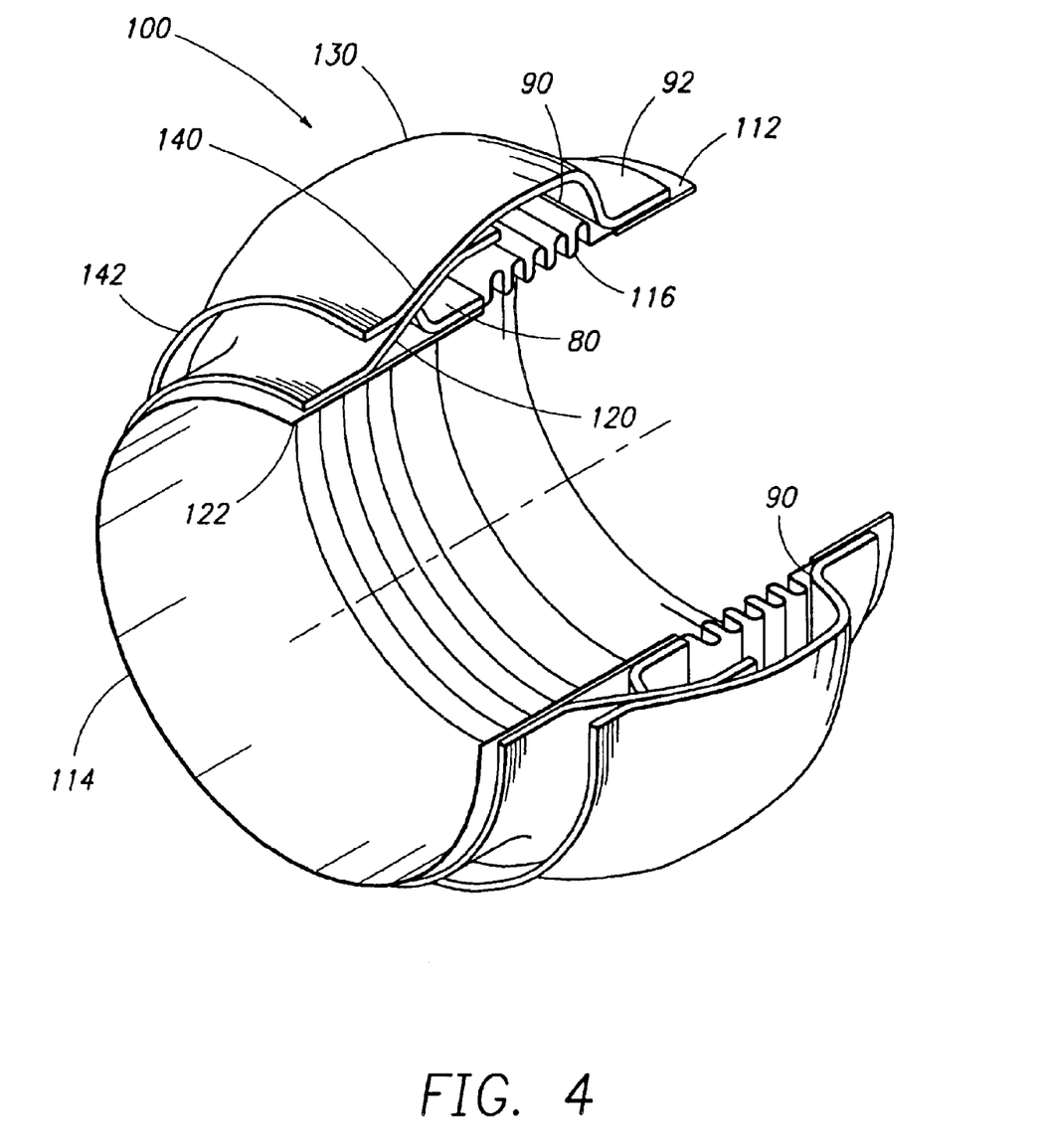
FIG. 4 is a schematic isometric view, partially cut away, of the ball joint assembly of FIG. 3 viewed from the right-hand end of FIG. 3.

The ball joint assembly 10 of FIGS. 1 and 2 is fabricated of stainless steel for use in a stainless steel pressurized line The alternative embodiment of FIGS. 3 and 4 is constructed for welding into titanium ducting.

The ball joint apparatus 100 of FIGS. 3 and 4 is similar in construction to the ball joint assembly 10 of FIGS. 1 and 2 except for the addition of particular structural elements and an assembly configuration which are adapted for use with titanium tubing and provide added structural support in the joint. The assembly 100 of FIG. 3 includes a bellows 116 which is formed as an extension of the right-hand tube 114. (FIG. 4 shows the assembly 100 in an inverse orientation to FIG. 3.) The ball element 120 is not welded to the tube 114 but is supported in position by an annular restraint collar 80 which is flared at its right-hand end 82 to provide support for the ball element 120. The restraint element 80 is welded at 84 to the tube 114.

On the left-hand side of the bellows 116 within the housing member 130, a corresponding flared restraint member 90 is positioned to provide restraint for the bellows 116 and support for the housing member 130. This is welded in place between the reduced diameter end 92 of the housing 130 and the extension 94 of the bellows 116. The welded assembly also includes a necked-down collar portion 96 of the left-hand tube 112, all four elements being welded together in a sort of sandwich configuration.

As with the embodiment of FIGS. 1 and 2, following installation of the housing 130, the entire assembly 100 is mounted in a press and rotated to swage the open end comprising portions 137 and 138 into the reduced diameter curved portion 140. This operation results in a collar 142 at the open end for added strength. The ball and housing members 120, 130 are supported in position by the respective restraint elements 84 and 90. Operation of the device of FIGS. 3 and 4 is as described above for the device of FIGS. 1 and 2.

Figure 5:
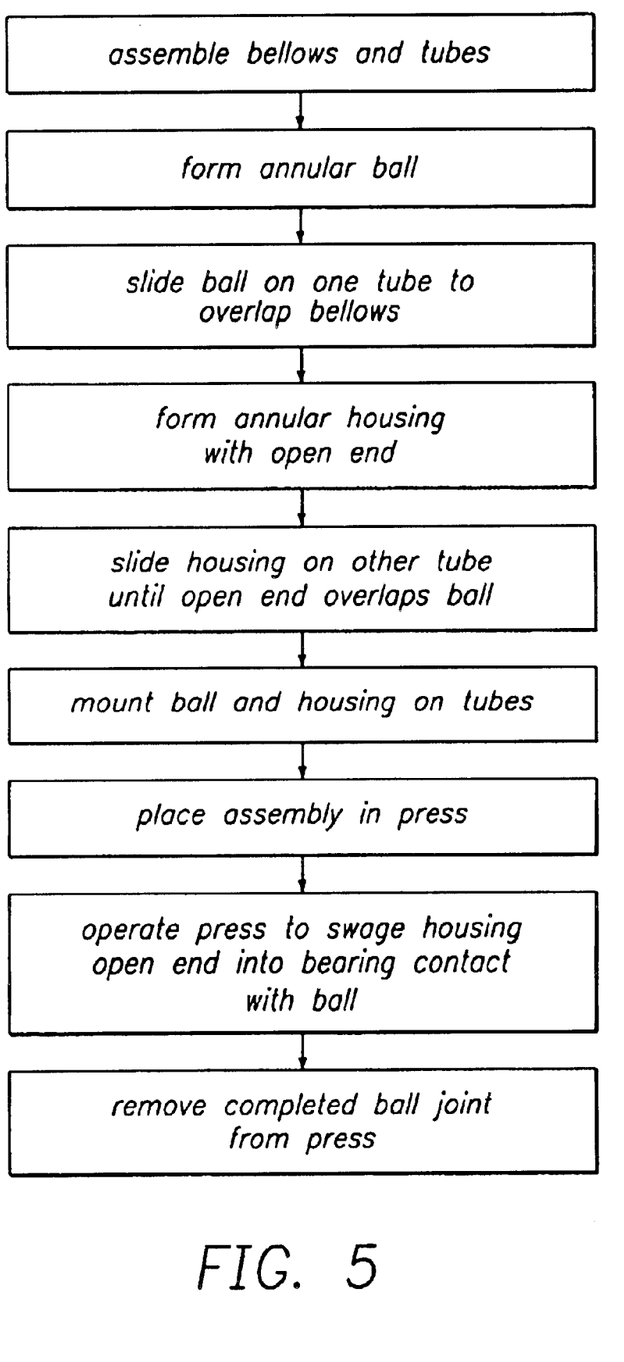
FIG. 5 is a schematic block diagram showing various steps in the method of fabrication of the ball joint apparatus of FIGS. 1 and 2.

The method of fabricating the ball joint of FIGS. 1 and 2 is represented schematically in the block diagram of FIG. 5 as comprising the steps of:

assembling a bellows between a pair of tube portions for attachment in a pressurized fluid line;

forming an annular ball member having an outer end of reduced diameter to match the diameter of a first one of the tube portions and an inner end of enlarged diameter suitable for overlapping the bellows;

sliding the ball member into position overlapping the bellows;

forming an annular housing member having a first end of reduced diameter matching the diameter of the second tube portion and a second end having a diameter exceeding the outer diameter of the ball member;

sliding the housing member along the second tube portion to a position where the second end overlaps the arcuate portion of the ball member between the inner and outer ends;

welding the first end of the housing member and the outer end of the ball member to the respective adjacent tube portions; and placing the thus-assembled combination in a hydraulic press and rotating the combination to swage the second end of the housing member radially inward to make contact with the outer surface of the ball member in the region of the generally arcuate portion thereof.

Figure 6:
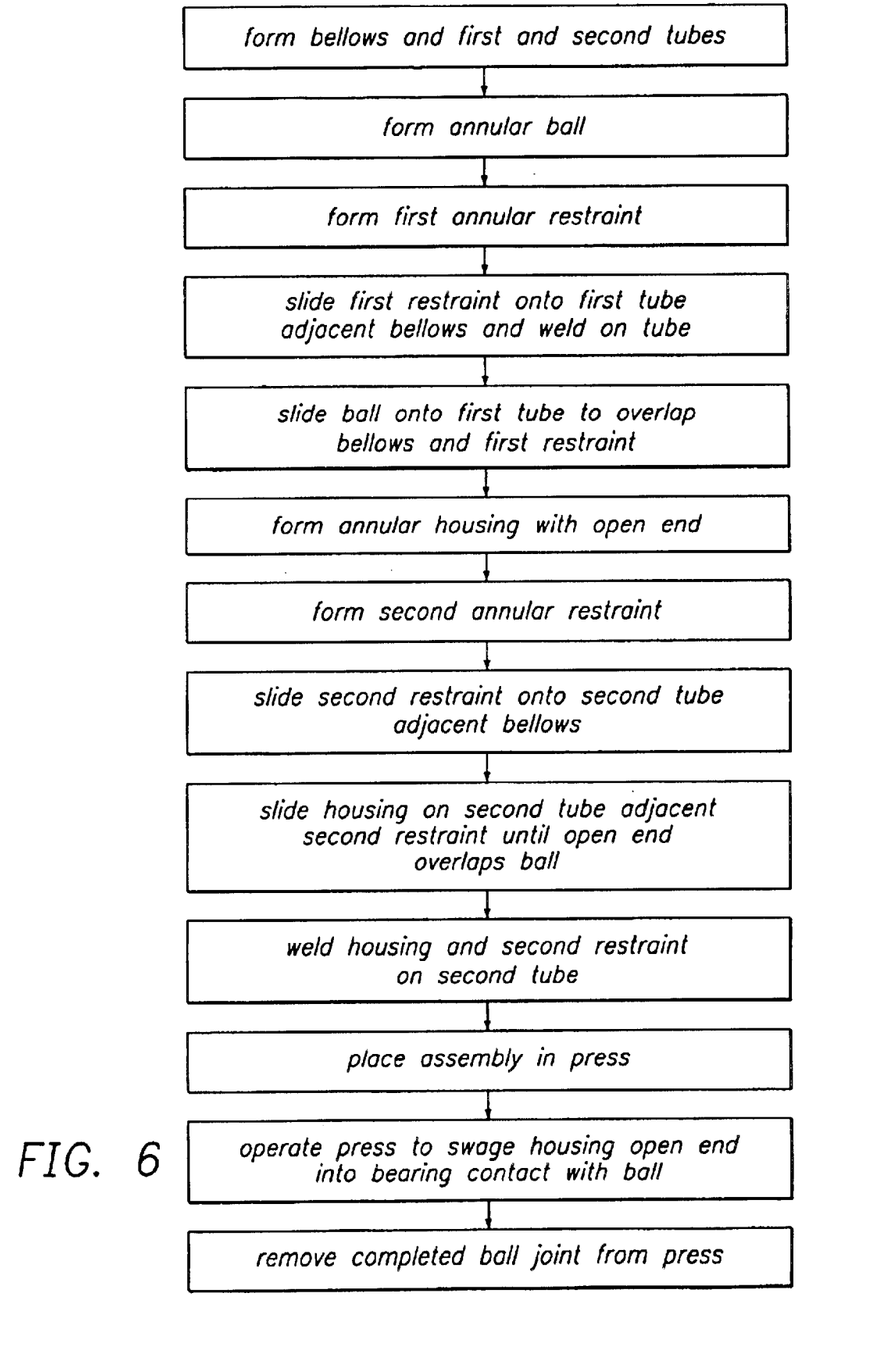
FIG. 6 is a schematic block diagram of an alternative method of fabrication for the embodiment of the invention shown in FIGS. 3 and 4.

The method of fabrication of the ball joint assembly of FIGS. 3 and 4 is schematically represented in the block diagram of FIG. 6 as comprising the steps of:

assembling a bellows between a pair of tube portions for attachment in a pressurized fluid line;

forming an annular ball member having an outer end of reduced diameter to match the diameter of a first one of the tube portions and an inner end of enlarged diameter suitable for overlapping the bellows;

forming a first annular restraint member configured to maintain the position of the bellows and support the ball member;

sliding the first annular restraint onto the first tube portion to a position adjacent the bellows;

welding the first restraint member to the first tube portion to retain it in position adjacent the bellows;

sliding the ball member onto the first tube portion to a position overlapping the first restraint and the bellows;

forming an annular housing member having a first end of reduced diameter matching the diameter of the second tube portion and a second end having a diameter exceeding the outer diameter of the ball member;

forming a second annular restraint member configured to provide support for a selected portion of the housing;

sliding the second restraint member onto the tubular extension adjacent the bellows on the side remote from the first annular restraint;

sliding the housing member along the second tube portion to a position adjacent the second annular restraint such that the second end overlaps the arcuate portion of the ball member between the inner and outer ends;

forming a necked-down collar of the second tube member and inserting the collar into the bellows extension;

welding the collar portion, the bellows extension, the second restraint member and the first end of the housing member together;

placing the thus-assembled combination in a hydraulic press and rotating the combination to swage the second end of the housing member radially inward to make contact with the outer surface of the ball member and the first restraint in the region of the generally arcuate portion thereof.

Although there have been described hereinabove various specific arrangements of a BALL JOINT APPARATUS AND METHOD OF FABRICATION in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the claims.

What is claimed is:

1. Apparatus including a metal ball joint assembly for permitting limited flexure in attached pressurized fluid lines, said assembly comprising:

first and second tubular sections extending on opposite ends of a central bellows which is capable of limited flexure to accommodate differences in axes angles of said tubular sections; and a housing surrounding and constraining said bellows to flexure within predetermined angle limits, said housing comprising:

an inner annular element of a first selected arcuate shape varying in diameter along its length from a first end shaped to match the diameter of the first tubular section to a second end of enlarged diameter suitable for overlapping said bellows; and an outer annular element of a second selected arcuate shape varying in diameter from a first end shaped to match the diameter of the second tubular section to an intermediate section of enlarged diameter exceeding the maximum diameter of the inner annular element and then to a necked-down section of reduced diameter at a second end, the intermediate section and the necked-down section overlapping and enclosing the second end of said inner element, the inner and outer annular elements having portions of said arcuate shapes matching in curvature to provide adjacent bearing surfaces which remain in sliding contact during flexure of the bellows;

wherein said bellows is formed as an extension of said first tubular section at one end of the bellows; and wherein the inner annular element is not attached to said first tubular section but is maintained in position against sliding along said first tubular section by a first annular restraint collar which is welded to said first tubular section near one end and flared outwardly at the other end to contact the inner surface of said inner annular element and support the inner annular element in a fixed position on said first tubular section.

2. The apparatus of claim 1 wherein said adjacent bearing surfaces comprise an inner surface of a portion of the outer element and an outer surface of a portion of the inner element which are maintained in supporting contact during flexure of the bellows.

3. The apparatus of claim 2 whereby said adjacent bearing surfaces are coated with a lubricant to reduce friction over the extent of surface contact.

4. The apparatus of claim 1 further including first and second pressurized fluid lines respectively connected to said first and second tubular sections in fluid communication therewith.

5. The apparatus of claim 4 wherein said connections comprise welded joints between the first and second tubular sections and corresponding ones of the pressurized fluid lines.

6. The apparatus of claim 1 wherein said outer element includes a circular lip portion at the termination of the necked-down section, said circular lip portion being generally orthogonal to the central longitudinal axis of said second tubular section.

7. The apparatus of claim 1 wherein said metal is stainless steel throughout the extent of said assembly.

8. The apparatus of claim 1 wherein said metal is titanium throughout the extent of said assembly and the assembly is structurally configured for welding to pressurized fluid lines which are fabricated of titanium.

9. The apparatus of claim 1 wherein contact of the flared end of the first annular restraint collar with the inner surface of the inner annular element is established in the region of the bearing surfaces between the inner and outer annular elements.

10. The apparatus of claim 1 further including a second annular restraint collar positioned at the end of said bellows remote from said first annular restraint collar for providing support to the outer annular element.

11. The apparatus of claim 10 wherein said second annular restraint collar is flared at one end to maintain contact with a portion of the outer annular element over a section of increasing diameter extending from the first end of said outer annular element.

12. The apparatus of claim 11 wherein the second annular restraint collar is welded in a sandwich configuration between an extension of the bellows and the first end of said outer annular element.

13. The apparatus of claim 1 wherein the necked-down portion of the outer annular element terminates in a circular collar which is generally orthogonal to the central longitudinal axis of the outer annular element to provide added support against deformation by forces between said bearing surfaces during flexure of the assembly.

14. The apparatus of claim 1 further including a second annular restraint collar near the end of the bellows remote from said first annular restraint collar, said second restraint collar being fixed in position and maintaining contact with said second annular element to provide support for said second annular element.

* * * * *